US012168201B1

(12) United States Patent
Valcarce Rial et al.

(10) Patent No.: US 12,168,201 B1
(45) Date of Patent: Dec. 17, 2024

(54) CARBON DIOXIDE CAPTURE FROM AMBIENT AIR

(71) Applicant: Nokia Solutions and Networks Oy, Espoo (FI)

(72) Inventors: Alvaro Valcarce Rial, Massy (FR); Olli Pekka Salmela, Helsinki (FI); Jari Markus Huttunen, Sonkajarvi (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/670,807

(22) Filed: May 22, 2024

(30) Foreign Application Priority Data

Jun. 5, 2023 (FI) ..................................... 20235626

(51) Int. Cl.
*B01D 53/02* (2006.01)
*B01D 53/04* (2006.01)
*B01D 53/62* (2006.01)

(52) U.S. Cl.
CPC ......... *B01D 53/62* (2013.01); *B01D 53/0438* (2013.01); *B01D 53/0462* (2013.01); *B01D 2257/504* (2013.01)

(58) Field of Classification Search
CPC ........................... B01D 53/62; B01D 53/0438; B01D 53/0462; B01D 2257/504
See application file for complete search history.

(56) References Cited

U.S. PATENT DOCUMENTS

| | | | | |
|---|---|---|---|---|
| 2014/0175336 A1* | 6/2014 | Gupta | ....................... | C07C 7/12 585/824 |
| 2015/0352518 A1* | 12/2015 | Meirav | .................... | B01J 20/08 502/401 |
| 2019/0120106 A1* | 4/2019 | Hamad | ..................... | F01N 5/02 |

FOREIGN PATENT DOCUMENTS

| | | | |
|---|---|---|---|
| CN | 212142032 U | 12/2020 | |
| WO | WO 2014/091590 A1 | 6/2014 | |

OTHER PUBLICATIONS

Nokia's Press Release, "Nokia adds Liquid Cooling technology to latest AirScale Base Station portfolio outlining commitment to sustainability #MWC22," Mar. 1, 2022, 3 pages.

\* cited by examiner

*Primary Examiner* — Christopher P Jones
(74) *Attorney, Agent, or Firm* — McCarter & English LLP

(57) ABSTRACT

To capture carbon dioxide from ambient air, a housing having at least five openings and one cooling route for a coolant from a base station to circulate within the housing may be used. The housing may include five openings: one for ambient air to enter the housing, one for the coolant to enter the housing, one for the coolant to exit the housing, one for air to exit the housing and one, the below most, for a carbon dioxide to exit the housing. The cooling route is between the openings for the coolant, formed by at least one partially insulated pipe with an uninsulated pipe surface portion. The housing further includes at least one disc made of a solid carbon dioxide sorbent material for capturing carbon dioxide and being arranged within the cooling route with a direct physical contact to the un-insulated pipe surface portion.

15 Claims, 3 Drawing Sheets

CARBON DIOXIDE CAPTURE FROM AMBIENT AIR

TECHNICAL FIELD

Various example embodiments relate to arrangements for capturing carbon dioxide from ambient air.

BACKGROUND

Carbon dioxide is a greenhouse gas, and its increased level in the atmosphere impacts to global warming. Direct air carbon capture, i.e. capturing carbon dioxide directly from ambient air, has been listed by Intergovernmental Panel on Climate Change, IPPC, as a necessary mitigation pathway to address global warming. There exists direct air carbon capture solutions that are based on large industrial-grade air sucking facilities. However, there is a need for smaller and leaner solutions, for example for mobile communications industry.

SUMMARY

The independent claims define the scope, and different embodiments are defined in dependent claims.

According to an aspect there is provided a housing comprising at least: a first opening for ambient air to enter the housing; a second opening for a coolant from a base station to enter the housing; a third opening for the coolant to exit the housing, wherein the third opening is below the second opening; at least one pipe forming a first cooling route to cool the coolant between the second opening and the third opening, wherein the at least one pipe forming the first cooling route is a partially insulated pipe with an uninsulated pipe surface portion; at least one disc made of a solid carbon dioxide sorbent material for capturing carbon dioxide from the ambient air, the at least one disc being arranged in the housing within the first cooling route with a direct physical contact to the uninsulated pipe surface portion for heating the at least one disc when the coolant passes the first cooling route; a fourth opening for air to exit the housing, wherein the fourth opening is below the third opening and the at least one pipe; and a fifth opening for a carbon dioxide to exit the housing, wherein the fifth opening is below the fourth opening.

In embodiments, the first opening is an inlet equipped with a first shutter; the second opening is equipped with at least one steering valve; the fourth opening is an outlet equipped with a second shutter; the fifth opening is an outlet equipped with a third shutter; a shutter has a first position closing a corresponding opening and a second position in which the corresponding opening is open; and the housing further comprises or is connected to a controller configured to control at least one of the at least one steering valve or positions of at least one of the shutters between the first position and the second position so that in an absorption cycle, in which the at least one disc adsorbs carbon dioxide from the ambient air, the first opening and the fourth opening are open, the at least one steering valve diverts the coolant from the first cooling route and the fifth opening is closed, and in a regeneration cycle, in which the carbon dioxide absorbed are released from the at least one disc, the first opening and the fourth opening are closed, the at least one steering valve diverts the coolant to the first cooling route and the fifth opening is opened.

In embodiments, the housing further comprises at least a fan arranged above the cooling pipes for drawing the ambient air inside the housing; the housing is arranged at least to be attached to a second cooling route so that the coolant will be fed either to the first cooling route or to the second cooling route near the second opening; a thermoelectric generator, which bottom side is attached to the second cooling route near the second opening to convert heat into electrical energy, the thermoelectric generator being connected to the fan to supply the fan with electrical energy; and a heat sink attached to the second cooling route.

In embodiments, the housing comprises at least one pipe forming the second cooling route between the second opening and the third opening, and the coolant passes from the second opening to the third opening either via the first cooling route or via the second cooling route, and the heat sink is arranged to the outer surface of the housing.

In embodiments, at least an inner surface of the housing has a cylindrical form within which at least the at least one disc and the at least one pipe forming the first cooling route are embedded; and a geometry of the at least one disc is a section of the cylindrical form of the inner surface.

In embodiments, the diameter of the inner surface is 75 cm.

In embodiments, perimeters of the at least one disc are encircled with the at least one pipe forming the first cooling route.

In embodiments, the height of the housing is 80 cm.

In embodiments, the length of the first cooling route is at least 10 meters and an inner diameter of the at least one pipe forming the first cooling route is 10 mm.

In embodiments, the housing comprises two or more discs stacked at a predefined spacing between two discs and with a tilt angle to a horizontal plane.

In embodiments, the housing comprises four discs with a height of 5 mm, the predefined spacing is 10 mm and the tilt angle 45°.

In embodiments, the solid carbon dioxide sorbent material is a low temperature solid sorbent material comprising an amine-based sorbent, or a potassium carbonate, or a tri-amine-grafted pore-expanded mesoporous silica or a polymer gel.

In embodiments, the solid carbon dioxide sorbent material is a low temperature solid sorbent material of aminoresin.

In embodiments, the solid carbon dioxide sorbent material is a low temperature solid sorbent material comprising a polymer gel having a density of 1 $g/cm^3$.

In embodiments, the carbon dioxide gas is fed via the fifth opening to a mast of the base station for storage.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the elements are not restricted by the terms. The terms are used merely for the purpose of distinguishing an element from other elements. For example, a first apparatus could be termed a second apparatus, and similarly, a second apparatus could be also termed a first apparatus without departing from the scope of the present disclosure.

5G (fifth generation), 5G-Advanced, and beyond future wireless networks, aim to support a large variety of services, use cases and industrial verticals, for example unmanned mobility with fully autonomous connected vehicles, other vehicle-to-everything (V2X) services, or smart environment, e.g. smart industry, smart power grid, or smart city, just to name few examples. To provide variety of services with different requirements, such as enhanced mobile broadband, ultra-reliable low latency communication, massive machine type communication, wireless networks are envisaged to adopt network slicing, flexible decentralized and/or distributed computing systems and ubiquitous computing, with local spectrum licensing, spectrum sharing, infrastructure sharing, and intelligent automated management underpinned by mobile edge computing, artificial intelligence, for example machine learning, based tools, cloudification, short-packet communication, and blockchain technologies. For example, in the network slicing multiple independent and dedicated network slice instances may be created within the same infrastructure to run services that have different requirements on latency, reliability, throughput and mobility.

It is envisaged that key features of 6G (sixth generation) will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Figure 1:
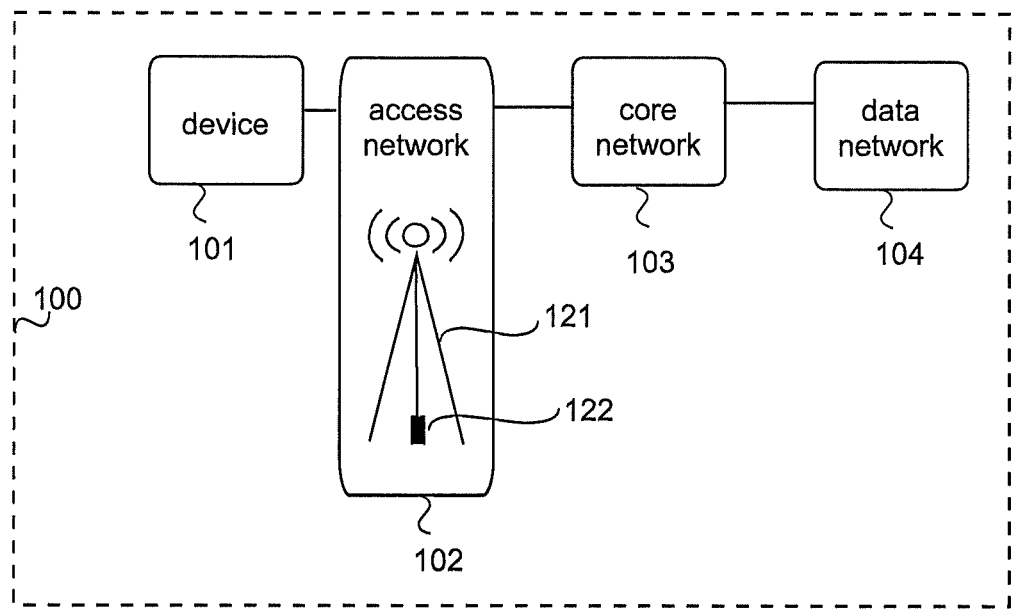
FIG. 1 illustrates an exemplified high-level network architecture.

FIG. 1 illustrates an exemplified high-level network architecture only showing some functional entities, all being logical units, whose implementation may differ from what is shown. The connections shown in FIG. 1 are logical connections; the actual physical connections may be different.

Referring to FIG. 1, a wireless network 100, or a system comprising wireless networks, comprises device components 101 for device functionalities in device domain, access network components 102 for access network functionalities in access network domain, core network components 103 for core network functionalities in core network domain, and data network components 104 for data network functionalities in data network domain.

A device component 101 may be any electrical device, or apparatus, connectable to an access network. A non-limiting list of examples of device components 101 comprises a user equipment, a smart phone, an internet of things device, an industrial internet of things device, a consumer internet of things device, an on-person device, a wearable device, such as a smart watch, a smart ring, an eHealth related device, a medical monitoring device, a sensor, such as pressure sensor, a humidity sensor, a thermometer, a motion sensor, an actuator, an accelerometer, etc., a surveillance camera, a vehicle, automated guided vehicles, autonomous connected vehicles etc.

An access network may be any kind of an access network, such as a cellular access network, for example 5G-Advanced network, a non-terrestrial network, a legacy cellular radio access network, or a non-cellular access network, for example a wireless local area network. To provide the wireless access, the access network comprises apparatuses, such as access devices, as access network components 102. There are a wide variety of access devices, including different types of base stations, such as eNBs, gNBs, split gNBs, transmission-reception points, network-controlled repeaters, nodes operationally coupled to one or more remote radio heads, satellites, donor nodes in integrated access and backhaul (IAB), fixed IAB nodes, mobile IAB nodes mounted on vehicles, for example, etc. At least some of the apparatuses in the access network may provide an abstraction platform to separate abstractions of network functions from the processing hardware.

The core network components 103 form one or more core networks. A core network may be based on a non-standalone core network, for example an LTE-based network, or a standalone access network, for example a 5G core network. However, it should be appreciated that the core network, and the core network components 103, may use any technology that enable network services to be delivered between devices and data networks.

A data network may be any network, like the internet, an intranet, a wide area network, etc. Different remote monitoring and/or data collection services for different use cases may be reached via the data network and the data network components 104.

Figure 2:
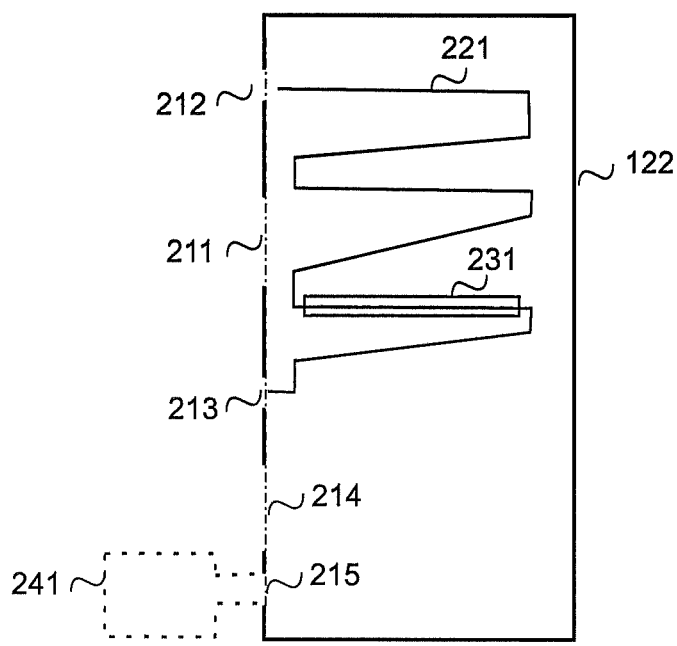
FIG. 2 is a schematic block diagram.
Figure 3:
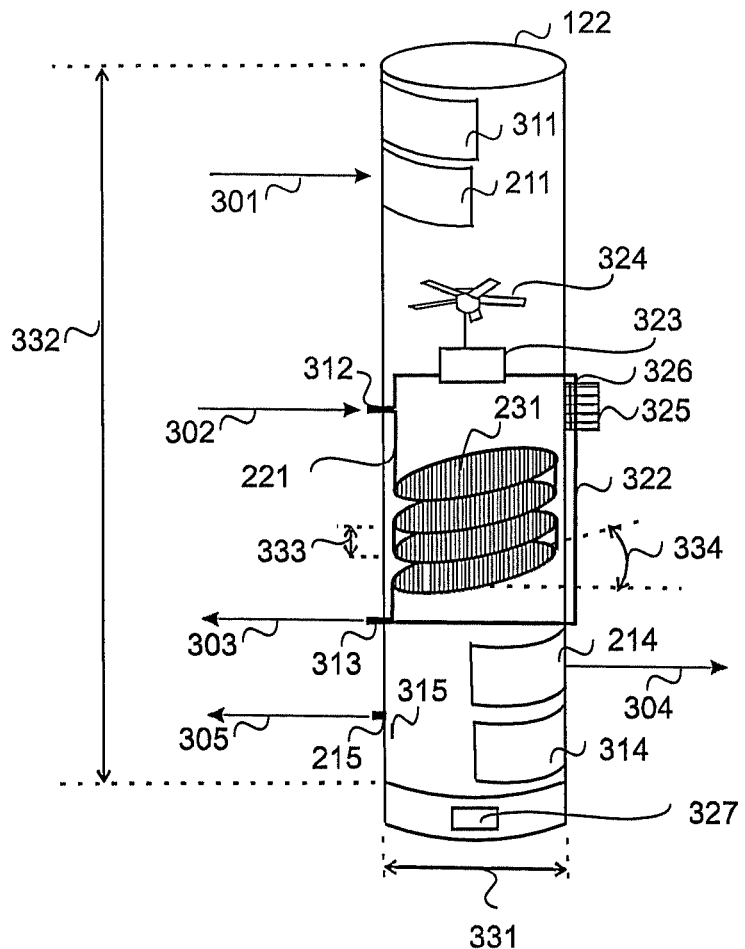
FIG. 3 is a schematic block diagram.
Figure 4:
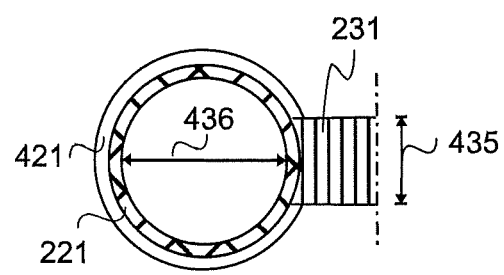
FIG. 4 is a schematic block diagram.

A base station 121 illustrates an example of a liquid cooled apparatus (component) in the access network that has at least a co-located housing 122 for capturing carbon dioxide from ambient air. In other words, the base station 121 represent any access network apparatus, whose excess heat is removed by a coolant, which may be cooling liquid or cooling fluid. The excess heat is removed from the base station to safeguard electronics comprised in the base station. The co-located housing 122 enables that the excess heat removed may be used for capturing carbon dioxide from ambient air. The basic principle of a capturing process is to adsorb carbon dioxide (carbon dioxide particles) from ambient air to a solid carbon dioxide sorbent material, for example during an absorption cycle, and periodically, during a regeneration cycle, extract the carbon dioxide (carbon dioxide particles) from the solid carbon dioxide sorbent material by heating the material using the excess heat removed. The housing may be freely installed in a site where the base station 121 locates, including integrating the housing to a mast of the base station. Hence, any site can be used for direct carbon air capture. FIG. 2 and FIG. 3 illustrate examples of the co-located housing 122 and FIG. 4 illustrates an example detail of the housing 122.

FIG. 2 is a highly simplified a schematic block diagram illustrating a cross sectional view of a non-limiting example of a structure of the housing 122 that may be used for capturing carbon dioxide from ambient air.

In the example of FIG. 2, the housing comprises at least a first opening 211, a second opening 212, a third opening 213, a fourth opening 214, a fifth opening 215, pipes (cooling pipes) forming a first cooling route 221 to cool a coolant, and at least one disc 231. When the housing 122 has been installed at a site, the order of the openings are as follows: the third opening 213 is below the first opening 211 and the second opening 212, the fourth opening 214 is below the third opening 213 and the pipes forming the first cooling route, and the fifth opening 215 is below the fourth opening 214. The second opening 212 may be above the first opening 211, as illustrated in FIG. 2, or the second opening 212 may be below the first opening 211, as illustrated in FIG. 3, or the openings may be at the same level, or approximately at the same level.

The first opening 211 is for ambient air to enter the housing 122. The second opening 212 is for a coolant (liquid coolant) from a base station, that is liquid-cooled base station, to enter the housing 122 and the third opening is for the coolant to exit the housing 122. The fourth opening is for air to exit the housing, the air exiting the housing 122 comprising less carbon dioxide than the ambient air, since at least some of the ambient air passes via the at least one disc 231 (solid sorbent disc). In other words, the air exiting the housing 122 is carbon-dioxide-poor air. The fifth opening 215 is for carbon dioxide, or a carbon dioxide stream, to exit the housing, for example to a carbon dioxide storage 241, or to a carbon dioxide disposal system. The placement of the fifth opening 215 to the lower part of the housing, and as the lowest opening, takes advantage of the carbon dioxide being heavier than ambient air, and the carbon-dioxide-poor air. The first opening may comprise a grille and a dust filter. Also the fourth opening may comprise a grille and a dust filter.

The first cooling route 221 formed by the pipes is between the second opening 212 and the third opening 213. The pipes forming the first cooling route 221 are partially insulated pipes with an uninsulated pipe surface portion, as shown in FIG. 4. The pipes may be made of aluminum. A coolant has a higher temperature when it enters the housing via the second opening 212 than the temperature the coolant has when it exits the housing via the third opening 213.

The at least one disc 231 is arranged in the housing 122 below the first opening 211 or at the same level as the first opening 211 and within the first cooling route 221 with a direct physical contact to the uninsulated pipe surface portion for heating the at least one disc when the coolant passes the first cooling route. For example, a perimeter of a disc may be enclosed by the uninsulated pipe surface portion of the pipes forming the first cooling route 122. With the direct physical contact heat is transferred from the pipes to the at least one disc via conduction (heat conduction). The at least one disc may be made of a solid carbon dioxide sorbent material for extracting carbon dioxide from the ambient air by adsorbing the carbon dioxide. A non-limiting list of examples of the solid carbon dioxide sorbent material include a low temperature solid sorbent material comprising an amine-based sorbent, or a potassium carbonate, or a triamine-grafted pore-expanded mesoporous silica, or a polymer gel. For example, aminoresin may be used as the low temperature solid sorbent material. It has been shown that during an one hour regeneration cycle of 60° C., a disc made of aminoresin having density of 0.5 g/cm$^3$ recovers 85 percent of its carbon dioxide adsorption capacity, and during a ten hour regeneration cycle approximately 100 percent of carbon dioxide adsorption capacity is recovered. Aminoresin having density of 0.5 g/cm$^3$ has a carbon dioxide adsorption capacity of 0.5 mml of CO$_2$/g of aminoresin. Aminoresin is a good fit for liquid-cooled base stations, in which a coolant (cooling fluid/cooling liquid) delivered by a liquid cooling system of the base station is at 63° C. when the coolant enters the housing, and can heat aluminum pipes that form the first cooling route to temperatures close to 60° C., which is the target regeneration temperature for aminoresin. Naturally, higher temperatures might also be used to accelerate the regeneration process. However, also other carbon dioxide sorbent materials may be used, for example any of the ones listed above. For example, a polymer gel having e.g. density of 1 g/cm$^3$ may be used to capture carbon dioxide. The polymer gel having the density of 1 g/cm$^3$, which have been derived from resorcinol and formaldehyde, has a carbon dioxide adsorption capacity of 3.13 mml of CO$_2$/g of polymer gel. In other words, the polymer gel is more effective in capturing carbon dioxide than the aminoresin.

The second opening 212 may be equipped with a steering valve that may be steered to allow the coolant to circulate through the first cooling route during the regeneration cycle to heat the at least one disc. During the adsorption cycle the coolant may be routed to a legacy cooling system, or to a legacy cooling route, for example to heat a residential building. A further example where to route the coolant during the adsorption cycle is illustrated in the example of FIG. 3.

The fourth opening 214 may be equipped with a shutter that closes the opening during the regeneration cycle and keeps the fourth opening open during the adsorption cycle. The first opening 211 may be equipped with a similar shutter arrangement as the fourth opening 214.

The fifth opening 215 may be equipped with a shutter that closes the opening during the adsorption cycle and keeps the fifth opening open during the regeneration cycle, to feed the carbon dioxide to the 214 carbon storage, or to the disposal system.

The carbon storage 214 may be any storage usable for storing carbon dioxide. For example, the carbon storage 241 may be a tank, e.g. a tank of nominal capacity of 3 tons of carbon dioxide, or a cylinder, e.g. a cylinder having nominal capacity of 74 kilograms, or less, of carbon dioxide. It is also possible to use a hollow interior of a mast of the base station as the carbon storage 241. The used carbon storage 214 and the used sorbent material both impact on the frequency with which the carbon storage 214 needs to be emptied or replaced. Hence, it is possible to customize the carbon collection based on the location of the base station. For example, it is possible to use more efficient sorbent material with small storages in city centers where, compared to rural areas, the ambient air contains more carbon dioxide, there is less space for the storage but frequent emptying of the carbon storage is not a big problem, and to use less efficient sorbet material and/or bigger storages in rural areas.

The disposal system may be any system usable for disposing carbon dioxide in a planned manner. For example, the carbon dioxide may be pumped directly underground, or injected into a long, possibly complex, piping network.

The cross section profile of the housing 122 is not illustrated in FIG. 2. It should be appreciated that the inner profile of the housing 122, within which the pipes forming the first cooling route, and hence the first cooling route, and the at least one disc are embedded, may be of any form, and the form of the inner profile may be different from the form of the outer profile of the housing 122. For example, the inner profile may be a circle, an ellipse, a half circle, a triangle, a rectangle, a parallelogram, or another trapezoid, just to mention few non-limiting examples.

FIG. 3 is a simplified a schematic block diagram illustrating a non-limiting example of a structure of the housing 122 that may be used for capturing carbon dioxide from ambient air. In the example of FIG. 3 the housing has a cylindrical form. It should be appreciated that the same principles may be used for other forms as well.

In the example of FIG. 3, as in the example of FIG. 2, the housing comprises the first opening 211 for ambient air 301 to enter the housing 122, the second opening 312 for the coolant 302 to enter the housing 122, the third opening 313 for the cooled coolant 303 to exit the housing 122, the fourth opening 214 for the carbon-dioxide-poor air 304 to exit the housing and the fifth opening 215 for the carbon dioxide 305 to exit the housing, for example to a carbon dioxide storage (not illustrated in FIG. 3), examples of which being described above with FIG. 2. The order of the openings is described with FIG. 2.

In the example of FIG. 3, the first opening 211 is an inlet equipped with a first shutter 311, the fourth opening 214 is an outlet equipped with a second shutter 314, and the fifth opening 215 is an outlet, e.g. an outlet valve, equipped with a third shutter 315. The first shutter may be called an inlet shutter, or air inlet shutter, the second shutter may be called an outlet shutter, or an air outlet shutter, and the third shutter may be called a carbon dioxide shutter. The shutters 311, 314, 315 may be electric gates, or any corresponding shutters, that are movable between a first position closing a corresponding opening and a second position in which the corresponding opening is open. During the regeneration cycle the first and the second shutters 311, 314 are in the first position, preventing carbon dioxide from escaping into the surroundings and the third shutter 315 in the second position to feed the carbon dioxide to the storage, and during the adsorption cycle the first and the second shutters 311, 314 are in the second position to let the ambient air to enter the housing and the processed air (i.e. the air that has been purified of carbon dioxide) to exit the housing and the third shutter 315 in the first position to prevent the carbon dioxide in the storage to be polluted by the processed air.

In the example of FIG. 3, there are plurality of the discs 231, stacked at a spacing 333 between two discs and with a tilt angle 334 to a horizontal plane of the housing. When the number of discs increases, the carbon dioxide adsorption capacity of the housing increases, but it may affect to other factors, like size of the housing and cycle duration. The spacing 333 may be a predefined spacing, repeated between the stacked discs, or spacing between stacked discs may vary. For example, there may be four discs with a tilt angle of 45° with 10 mm spacing. The tilt angle of 45° maximizes the adsorbing surface area. Naturally any other number of discs may be used and/or another tilt angle and/or another spacing. Different examples of solid carbon dioxide sorbent material for the discs are described with FIG. 3. The discs, or some of them, may be of the same material, or of different material. In the example of FIG. 3 the geometry of the discs 231 is a section of the cylindrical form of the inner surface of the housing 122.

In the example of FIG. 3, the first cooling route 221 encircles peripherals of the discs 261, and are in the direct connection, as described above with FIG. 2 and will be described below with the detail of FIG. 4.

In the example of FIG. 3, there is also a second cooling route 322 formed by pipes (cooling pipes). The pipes forming the second cooling route 322 may be uninsulated pipes. Naturally, it is also possible to use in the second cooling route partially insulated pipes, or insulated pipes. In the illustrated example of FIG. 3 the second cooling route is also between the second opening 212 and the third opening 213, below the first opening 211 and above the fourth opening 214, arranged so that the first cooling route 221 and the plurality of discs 231 are surrounded by the second cooling route but not at a direct connection, except near the second and third openings the second cooling route and the first cooling route are close to each other, enabling the coolant to enter and exit the housing regardless of the cooling route the coolant circulates.

In the example of FIG. 3 the second opening 312 is equipped with at least one steering valve diverting (steering) the coolant to circulate either through the first cooling route 221, during the regeneration cycle, or through the second cooling route 322, during the adsorption cycle. There may be steering valves per a cooling route, for example an electrohydraulic steering valve for the first cooling route, and an electrohydraulic steering valve for the second cooling route, wherein the valves can be positioned so that the coolant circulates either through the first cooling route or through the second cooling route.

The second cooling route 311 may be partially outside the housing 122, as in the example of FIG. 3. The housing may comprise a heat sink 325 arranged to the outer surface of the housing 122 and attached to the second cooling route. There may be an insulating layer 326 between the outer surface and the second cooling route on the opposite side of the heat sink 325. The heat sink 325 is an external heat sink to dissipate heat from the coolant into the ambient air outside the housing when the coolant circulates through the second cooling route, i.e. during the adsorption cycles.

The housing 122 may comprise, as in the example of FIG. 3, a fan 324 arranged above the pipes for drawing the ambient air 301 inside the housing. Any means to power the fan may be used. The fan may locate below the first opening, as in the example of FIG. 3, or be at the same level as the first opening or above the first opening. It is advisable to take into account the number of discs when deciding which kind of fan is used: the bigger the number of discs is, the stronger the fan has to be, to move air between the discs.

The housing 122 may comprise a thermoelectric generator 323, or corresponding device converting thermal heat into electrical energy. The bottom side (hot side) of the thermoelectric generator 323 may be attached to the second cooling route near the second opening 312 to convert heat (excess heat, which is extracted from the base station via the coolant) into electrical energy. The thermoelectric generator 323 may be connected to the fan 324 to supply the fan with electrical energy. Thermoelectric generators usually have very low conversion efficiencies, typical values could be around $\eta_{TE}=3.5\%$, and hence it may be alone not efficient enough to cool the coolant. Therefore in some implementations, as in the example of FIG. 3, the external heatsink 325 may be used to further cool the coolant. Further, in some implementations the upper side (cold side) of the thermoelectric generator may be adhered to the mast of the base station. The mast may then act as a high thermal load with natural cooling properties.

In the example of FIG. 3, the housing 122 further comprises a controller 327, or a control system, configured to control the at least one steering valve and positions of the shutters between the first position and the second position so that in an absorption cycle, in which the at least one disc adsorbs (captures) carbon dioxide from the ambient air, the first opening and the fourth opening are open, the at least one steering valve diverts the coolant from the first cooling route to the second cooling route and the fifth opening is closed, and in a regeneration cycle, in which the carbon dioxide adsorbed are released from the discs, the first opening and the fourth opening are closed, the steering valve diverts the coolant to the first cooling route and the fifth opening is open. The controller may also control the fan 324. For example, the controller may control the fan's 324 speed, for example based on surrounding environmental conditions (atmosphere), by taking into account, for example, temperature, humidity, season, time of the day, etc. The controller may further stop the fan before closing the first opening and the fourth opening, to avoid suction forces that may damage the discs. The controller 327 may be a central processing unit-based controller, for example a small microcontroller powered, for example, by a small long-life battery. Naturally the controller may be a remote controller, for example comprised in control circuitry of the base station. The controller 327 may have a wired or wireless connection to the valve(s) and shutter(s) the controller controls.

The housing 122 may comprise a small cavity (a control cavity) to accommodate the controller. For example, the housing may be internally divided in the control cavity and a larger cavity, an adsorption chamber, which comprises the openings, one or more cooling routes and the one or more discs. The internal cavities may be vertically collocated, as is illustrated in FIG. 3. It should be appreciated that any other cavity arrangement is possible.

The dimensions of the larger cavity, i.e. in the example of FIG. 3 internal diameter 331 and internal height 332 of the larger cavity, dictate the size and number of solid discs, and then the carbon dioxide capture capacity. However, since in practice, the height of the small cavity is very small compared to the internal height 322, the internal height of the larger cavity may be used as the height of the housing.

FIG. 4 is a schematic block diagram of a detail illustrating the direct contact between the disc 231 and the uninsulated pipe surface portion of a pipe in the first cooling route 221, the pipe having partial insulation 421. The detail of FIG. 4 also shows the thickness 435 of the disc, and the inner diameter 436 of the pipe in the first cooling route 221. It should be appreciated that even though in the illustrated example of FIG. 4, the thickness corresponds to the uninsulated pipe surface portion, in other implementation the disc may also have direct contact also to insulated pipe surface portion, e.g. to a minor part of it, or part of the uninsulated pipe surface portion may not have a direct contact to a disc.

In another implementation, the one or more pipes forming the second cooling route may be outside the housing, but attached to the housing so that the coolant will be fed either to the first cooling route or to the second cooling route near the second opening. In such an arrangement, the thermoelectric generator may also locate outside the housing while still being connected to the fan to supply the fan with electrical energy.

In the below, non-limiting examples relating to dimensioning the housing example of FIG. 3, for example, are described.

The first cooling route, and the one or more discs within the first cooling route, has to be able to capture carbon dioxide and to cool the coolant by removing heat. To achieve the cooling, the surface area of contact between the cooling solution and the one or more pipes must be properly dimensioned. To cool down a volume $v_{sol}$ of the coolant/cooling fluid from $T_{sol,h}$=63° C. down to $T_{sol,c}$=56° C., the coolant would need to loose an amount of heat equal to $$Q = q_{sol} \cdot c_{sol} \cdot \Delta T_{sol},$$

where $c_{sol}$ is the coolant's specific heat in J/gK, $q_{sol}$ is the mass flow rate in kg/min of the coolant circulating in the first cooling route and $\Delta T_{sol} = T_{sol,h} - T_{sol,c}$. When the coolant is a glycol based coolant with a specific heat of $c_{sol}$=3.35 kJ/(kg K), pumped at a rate of $$q_{sol} = 4 \frac{\text{kg}}{\text{min}},$$

the heat lost by the coolant while circulating through the first cooling rate is approximately:

$$Q = 1563 \text{ W}$$

For heat balance reasons, this heat must first be absorbed by the pipes forming the first cooling route. Assuming a surface A of a contact between the coolant and the pipes, interior, the heat adsorbed by the pipes is $$Q_p = A \cdot h_l \cdot dT$$

where $h_l \approx 10$ kW/(m² K) is the coolant-to-pipe heat transfer coefficient, and $dT = T_{L,avg} - T_{pipe}$ is the average temperature difference between the coolant and the pipes. The inner surface of the first cooling route (and the pipes) is $A = \pi \cdot L \cdot D$ where L is the length of the first cooling route and D=10 mm inner diameter of pipes forming the first cooling route. Hence, combining the previous two equations yields $$T_{pipe} = T_{L,avg} - \frac{Q}{\pi \cdot D \cdot h_l \cdot L}$$

Assuming an inner diameter D of the pipes forming the first cooling route is 10 mm, a first cooling route with a length L≥10 m will heat the one or more pipes forming the first cooling route to $T_{pipe} \approx 59°$ C. That is close to the target sorbent regeneration temperature of aminoresin.

The surface area $S_m$ of an elliptical solid disc, whose cylindrical section angle (tilt angle) is om is: $\propto_m$ is:

$$S_m = \pi \cdot \left(\frac{D_{in}}{2}\right)^2 \cdot \sec(\alpha_m)$$

Therefore, accounting for the number of discs, the total sorbent area $S_{sorbent}$ leveraged by the discs is:

$$S_{sorbent} = N_m \cdot \pi \cdot \left(\frac{D_{in}}{2}\right)^2 \cdot \cdot \sec(\alpha_m)$$

and the total sorbent volume $V_{sorbent}$ will be:

$$V_{sorbent} = N_m \cdot \pi \cdot \left(\frac{D_{in}}{2}\right)^2 \cdot \sec(\alpha_m) \cdot d_m$$

The vertical size of the housing, and the internal height of the larger cavity, is dictated by the number of sorbent discs. In particular, the total height $h_{stack}$ of a stack of $N_m$ discs as the ones described above is:

$$h_{stack} = (N_m - 1)d_m + N_m w_m + D_{in} \tan \alpha_m$$

For example, when $N_m$=4 discs with a thickness of $w_m$=5 mm, interspaced $d_m$=1 cm and tilted $\alpha_m$=45°, in a cylindrical inner format of the housing with an inner diameter a cylindrical chamber of diameter $D_{in}$=75 cm, the vertical height of the housing would be approximately 80 cm (a height similar to a domestic washing machine).

The temperature reached by the discs due to heat conduction with the one or more pipes forming the first cooling route may be calculated by solving the steady-state heat equation for a two-dimensional disc in cylindrical coordinates (polar coordinates pinpointing a position on the disc's surface). The steady-state equation is:

$$\frac{1}{r} \cdot \frac{\delta}{\delta r}\left(r \cdot \frac{\delta T}{\delta r}\right) + \frac{1}{r^2} \cdot \frac{\delta^2 T}{\delta \theta} = 0,$$

where r is the radius from the disc's center, θ is the angle and T(r, θ) is the temperature profile across the disc. The boundary conditions for this equation are:

$$T(a, \theta) = T_{pipe}$$

$$T(r, -\pi) = T(r, +\pi)$$

$$\frac{\delta T}{\delta \theta}(r, -\pi) = \frac{\delta T}{\delta \theta}(r, +\pi)$$

The solution to this differential equation is $T(r, \theta) = T_{pipe}$, which means that, in the steady state, the whole disc will reach the same temperature as the one or more pipes forming the first cooling route.

When the heat lost Q of the coolant is also 1563 W in the second cooling route, and the conversion efficiency of a thermoelectric generator attached to the second cooling route $\eta_{TE}$=3.5% the total electrical power produced by the thermoelectric generator is on the order of $\eta_{TE} \cdot Q$=70 W. This is enough to power a small fan to draw ambient air into the larger chamber.

Figure 5:
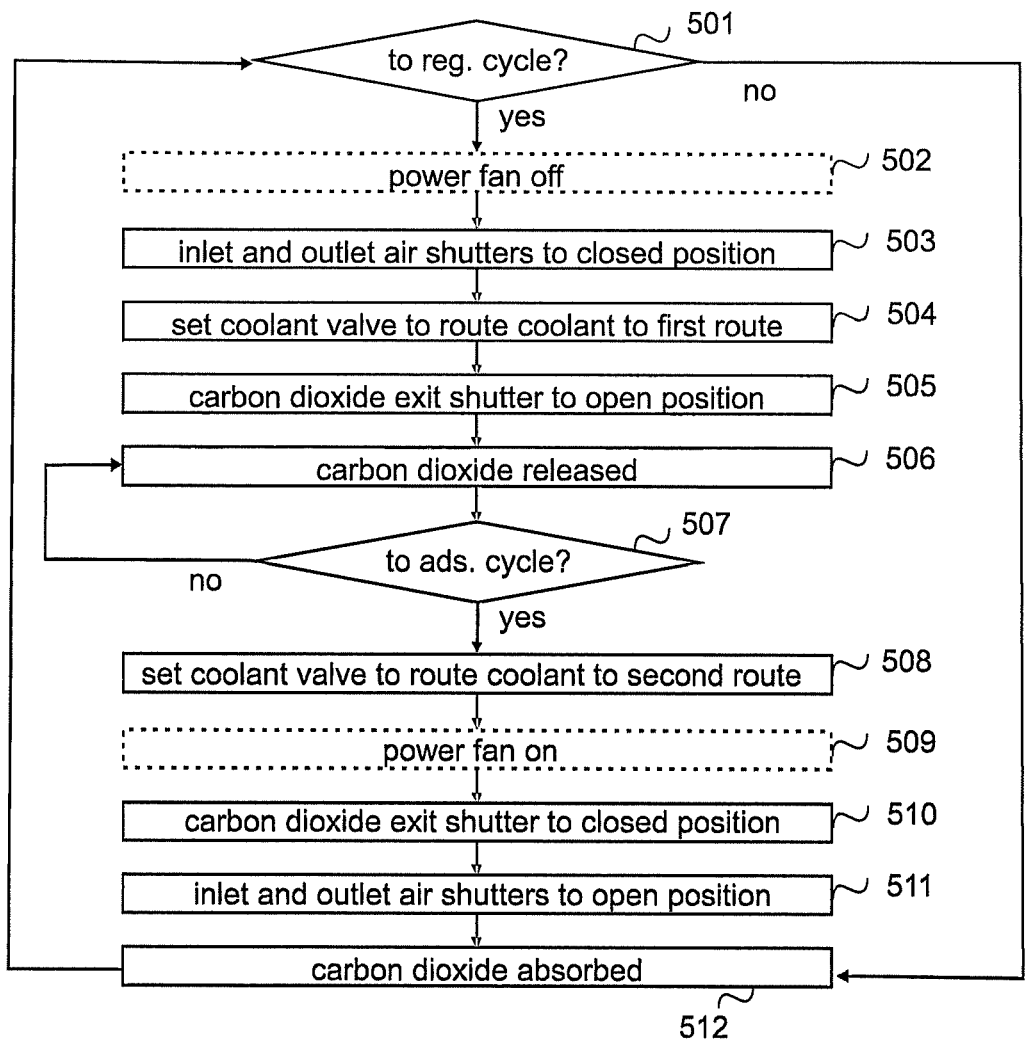
FIG. 5 illustrates an example functionality.

FIG. 5 illustrates an example control functionality of the controller with carbon dioxide capturing process, which comprises alternating regeneration cycles (reg. cycle) and adsorption cycles.

Referring to FIG. 5, when it is time (block 501: yes) to change from an adsorption cycle to a regeneration (reg.) cycle, a fan may be powered off (block 502) by the controller, the inlet and outlet air shutters (the first and the second shutter) are moved (block 503) to closed positions, in which ambient air cannot enter the housing and processed air (carbon-dioxide-poor air) cannot exit the housing. Further, the one or more steering valves are set (block 504) to route the coolant to the first cooling route, to heat the discs so that carbon dioxide adsorbed to the discs will be released. The carbon dioxide exit shutter (the third shutter) is moved (block 505) to an open position, opening the fifth opening for the carbon dioxide to exit the housing to the carbon dioxide storage.

No further control function is performed during regeneration cycle and the carbon dioxide is released (block 506) by the heat from the one or more discs.

When it is time (block 507: yes) to change from the regeneration cycle to the adsorption (ads.) cycle, the one or more steering valves are set (block 508) to route the coolant to the second cooling route, a fan may be powered on (block 509) by the controller, and the carbon dioxide exit shutter (the third shutter) is moved (block 510) to a closed position, closing the fifth opening so that nothing is fed to the carbon dioxide storage. Further, the inlet and outlet air shutters (the first and the second shutter) are moved (block 511) to open positions, in which ambient air can enter the housing, pass through the one or more discs so that they can adsorb carbon dioxide from the air and processed air (carbon-dioxide-poor air) can exit the housing.

No further control function is performed during adsorption cycle and the carbon dioxide is adsorbed (block 512) by the one or more discs, until it is time (block 501: yes) to change to a regeneration cycle.

The durations of the cycles depends e.g. on the time needed by the disc material to heat and recover its adsorption capacity, i.e. release the adsorbed carbon dioxide. For example, for aminoresin the duration of the regeneration cycle may be 10 hours and the duration of the adsorption cycle may be 2 hours. This means that during a day there are two cycles. The time difference between the durations is mainly due to Using the example housing of 4 discs with the thickness of 5 mm, interspaced by 1 cm and tilted 45° in a cylindrical inner format of the housing with the inner diameter of 75 cm, the above durations of the cycles, the molar mass of carbon dioxide $M_{CO2}$=44.01 g, and following equations, an amount of captured carbon dioxide can be estimated.

Total sorbent mass of the one or more discs m can be calculated as a result of the volume V and the density ρ

$$m_{sorbent} = V_{sorbent} \cdot \rho_{sorbent}$$

The one or more discs will be able to capture per an adsorption cycle a total carbon dioxide mass of $C_{cycle} = m_{sorbent} \cdot q_{sorbent} \cdot M_{CO2}$ where q is the adsorption capacity of the sorbent material of the disc.

The total carbon dioxide mass collected per day depends on the number N of adsorption cycles as follows, $C_{day} = N_{cycles} \cdot C_{cycle}$ and per year $C_{year} = 365 \cdot C_{day}$.

Using the aminoresin with density of 0.5 g/cm³, it may be possible to collect about 67 kg of carbon dioxide with the example housing in one year. This is nearly 6 percent of the average carbon dioxide emissions of a 5G base station in France in year 2020. Using the polymer gel with the density of 1 g/cm³ and assuming kinetics similar to that of the aminoresin, it may be possible to collect about 1200 kg of carbon dioxide with the example housing in one year, nearly 105 percent of said average carbon dioxide emissions of a 5G base station.

Figure 6:
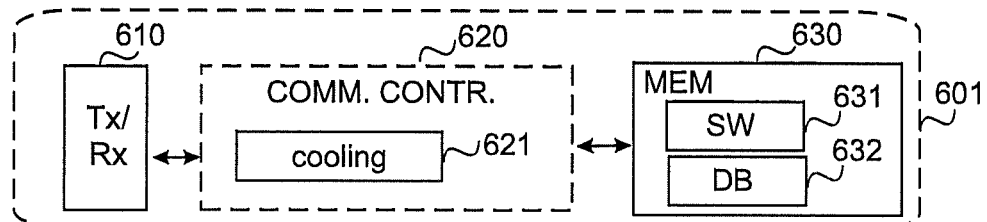
FIG. 6 is a schematic block diagram.
Figure 7:
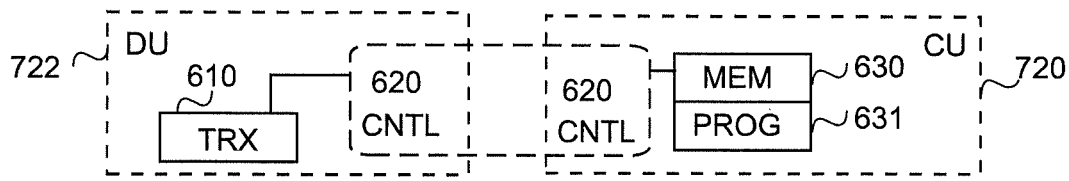
FIG. 7 is a schematic block diagram.

FIG. 6 illustrates an apparatus, e.g. a base station or another network device, that may be configured to control closing and opening of the openings of one or more housings, and/or steering coolant to different cooling routes, for capturing carbon dioxide as described above. FIG. 7 illustrates an apparatus that may implement distributed functionality of the apparatus illustrated in FIG. 6.

The apparatus 601 may comprise one or more communication control circuitries 1120, such as at least one processor, and at least one memory 630, including one or more algorithms 631, such as a computer program code (software) wherein the at least one memory and the computer program code (software) are configured, with the at least one processor, to cause the apparatus to carry out any one of the exemplified control functionalities described above. Said at least one memory 630 may also comprise at least one database 632.

According to an embodiment, there is provided an apparatus comprising at least one processor; and at least one memory storing instructions that, when executed by the at least one processor, cause the apparatus to at least: control positions of one or more shutters and/or one or more steering valves.

According to an embodiment, there is provided an apparatus comprising at least means for controlling positions of one or more shutters and/or means for controlling one or more steering valves.

Referring to FIG. 6, the one or more communication control circuitry 620 of the apparatus 601 comprise at least carbon dioxide ($CO_2$) capturing circuitry 621, which is configured to implement one or more of the control functionalities relating to one or more shutters and/or one or more steering valves. To this end, the carbon dioxide capturing circuitry 621 of the apparatus 601 is configured to carry out at least some of the functionalities of the controller described above, for example, by the apparatus transmitting control information, using one or more individual circuitries.

Referring to FIG. 6, the memory 630 may be implemented using any suitable data storage technology, such as semiconductor based memory devices, flash memory, magnetic memory devices and systems, optical memory devices and systems, fixed memory and removable memory.

Referring to FIG. 6, the apparatus 601 may further comprise different interfaces 610 such as one or more communication interfaces (TX/RX) comprising hardware and/or software for realizing communication connectivity according to the one or more communication protocols. The one or more communication interfaces 610 may enable connecting to the Internet and/or to a core network of a wireless communications network. The one or more communication interface 610 may provide the apparatus with communication capabilities to communicate in a cellular communication system and enable communication to different network nodes or elements or electric devices in the network or terminal devices or user equipments, for example. The one or more communication interfaces 610 may comprise standard well-known components such as an amplifier, filter, frequency-converter, (de) modulator, and encoder/decoder circuitries, controlled by the corresponding controlling units, and one or more antennas.

In an embodiment, as shown in FIG. 7, at least some of the functionalities of the apparatus of FIG. 6 may be shared between two physically separate devices, forming one operational entity. Therefore, the apparatus may be seen to depict the operational entity comprising one or more physically separate devices for executing at least some of the described processes. Thus, the apparatus of FIG. 7, utilizing such shared architecture, may comprise a remote control unit RCU 720, such as a host computer or a server computer, operatively coupled (e.g. via a wireless or wired network) to a remote distributed unit RDU 722 located in the base station. In an embodiment, at least some of the described control functionalities may be performed by the RCU 720. In an embodiment, the execution of at least some of the described control functionalities may be shared among the RDU 722 and the RCU 720.

Similar to FIG. 6, the apparatus of FIG. 7 may comprise one or more communication control circuitries (CNTL) 620, such as at least one processor, and at least one memory (MEM) 630, including one or more algorithms (PROG) 631, such as a computer program code (software) wherein the at least one memory and the computer program code (software) are configured, with the at least one processor, to cause the apparatus to carry out any one of the exemplified functionalities of the controller described above.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the control functionalities described above may be carried out by an apparatus comprising corresponding means for carrying out at least some of the described control functionalities. Some example means for carrying out the processes may include at least one of the following: detector, processor (including dual-core and multiple-core processors), digital signal processor, controller, receiver, transmitter, encoder, decoder, memory, RAM, ROM, software, firmware, circuit, antenna circuitry, and circuitry. In an embodiment, the at least one processor, the memory, and the computer program code form processing means or comprises one or more computer program code portions for carrying out one or more control operations according to any one of the examples or operations thereof.

Embodiments and examples as described relating to the controller may also be carried out in the form of a computer process defined by a computer program or portions thereof, for example by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. The term "non-transitory," as used herein, is a limitation of the medium itself (i.e., tangible, not a signal) as opposed to a limitation on data storage persistency (e.g., RAM vs. ROM). Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A housing comprising at least: a first opening for ambient air to enter the housing; a second opening for a coolant from a base station to enter the housing; a third opening for the coolant to exit the housing, wherein the third opening is below the second opening; at least one pipe forming a first cooling route to cool the coolant between the second opening and the third opening, wherein the at least one pipe forming the first cooling route is a partially insulated pipe with an uninsulated pipe surface portion; at least one disc made of a solid carbon dioxide sorbent material for capturing carbon dioxide from the ambient air, the at least one disc being arranged in the housing within the first cooling route with a direct physical contact to the uninsulated pipe surface portion for heating the at least one disc when the coolant passes the first cooling route; a fourth opening for air to exit the housing, wherein the fourth opening is below the third opening and the at least one pipe; and a fifth opening for a carbon dioxide gas to exit the housing, wherein the fifth opening is below the fourth opening.

2. The housing of claim 1, wherein the first opening is an inlet equipped with a first shutter; the second opening is equipped with at least one steering valve; the fourth opening is an outlet equipped with a second shutter; the fifth opening is an outlet equipped with a third shutter; at least one shutter has a first position closing a corresponding opening and a second position in which the corresponding opening is open; and the housing further comprises or is connected to a controller configured to control at least one of the at least one steering valve or positions of at least one of the shutters between the first position and the second position so that in an absorption cycle, in which the at least one disc adsorbs carbon dioxide from the ambient air, the first opening and the fourth opening are open, the at least one steering valve diverts the coolant from the first cooling route and the fifth opening is closed, and in a regeneration cycle, in which the carbon dioxide absorbed are released from the at least one disc, the first opening and the fourth opening are closed, the at least one steering valve diverts the coolant to the first cooling route and the fifth opening is opened.

3. The housing of claim 1, wherein the housing further comprises at least a fan arranged above the at least one pipe for drawing the ambient air inside the housing; the housing is arranged at least to be attached to a second cooling route so that the coolant will be fed either to the first cooling route or to the second cooling route near the second opening; a thermoelectric generator, which bottom side is attached to the second cooling route near the second opening to convert heat into electrical energy, the thermoelectric generator being connected to the fan to supply the fan with electrical energy; and a heat sink attached to the second cooling route.

4. The housing of claim 3, wherein the housing comprises at least one pipe forming the second cooling route between the second opening and the third opening, and the coolant passes from the second opening to the third opening either via the first cooling route or via the second cooling route, and the heat sink is arranged on the outer surface of the housing.

5. The housing of claim 1, wherein
at least an inner surface of the housing has a cylindrical form within which at least the at least one disc and the at least one pipe forming the first cooling route are embedded; and
a geometry of the at least one disc is a section of the cylindrical form of the inner surface.

6. The housing of claim 5, wherein the diameter of the inner surface is 75 centimeters.

7. The housing of claim 5, wherein perimeters of the at least one disc are encircled with the at least one pipe forming the first cooling route.

8. The housing of claim 5, wherein the height of the housing is 80 centimeters.

9. The housing of claim 1, wherein the length of the first cooling route is at least 10 meters and an inner diameter of the at least one pipe forming the first cooling route is 10 millimeters.

10. The housing of claim 1, wherein the at least one disc comprises two or more discs stacked at a predefined spacing between two discs and with a tilt angle to a horizontal plane.

11. The housing of claim 10, wherein the two or more discs comprises four discs with a height of 5 millimeters, the predefined spacing is 10 millimeters, and the tilt angle is 45 degrees.

12. The housing of claim 1, wherein the solid carbon dioxide sorbent material is a low temperature solid sorbent material comprising an amine-based sorbent, or a potassium carbonate, or a triamine-grafted pore-expanded mesoporous silica or a polymer gel.

13. The housing of claim 1, wherein the solid carbon dioxide sorbent material is a low temperature solid sorbent material of aminoresin.

14. The housing of claim 1, wherein the solid carbon dioxide sorbent material is a low temperature solid sorbent material comprising a polymer gel having a density of 1 gram per cubic centimeter.

15. The housing of claim 1, wherein the carbon dioxide gas is fed via the fifth opening to a mast of the base station for storage.

* * * * *